United States Patent
Ogawa et al.

(10) Patent No.: US 8,651,384 B2
(45) Date of Patent: Feb. 18, 2014

(54) CODE READING APPARATUS AND COMPUTER PROGRAM PRODUCT

(75) Inventors: Yasuaki Ogawa, Tachikawa (JP); Keiichi Tanioka, Ome (JP)

(73) Assignee: Casio Computer Co., Ltd., Tokyo (JP)

( * ) Notice: Subject to any disclaimer, the term of this patent is extended or adjusted under 35 U.S.C. 154(b) by 41 days.

(21) Appl. No.: 13/434,246

(22) Filed: Mar. 29, 2012

(65) Prior Publication Data

US 2012/0248190 A1    Oct. 4, 2012

(30) Foreign Application Priority Data

Mar. 30, 2011    (JP) .................. 2011-074768

(51) Int. Cl.
*G06K 7/10*    (2006.01)
*G02B 1/06*    (2006.01)

(52) U.S. Cl.
USPC ............... 235/454; 235/462.01; 235/462.2; 359/665; 359/666

(58) Field of Classification Search
USPC ........... 235/454, 462.1–462.49; 359/665–666
See application file for complete search history.

(56) References Cited

U.S. PATENT DOCUMENTS

| | | | |
|---|---|---|---|
| 2006/0038017 A1* | 2/2006 | Carlson et al. ........... | 235/462.24 |
| 2006/0118629 A1* | 6/2006 | Shiramizu et al. ............ | 235/454 |
| 2010/0040355 A1* | 2/2010 | Craen et al. ..................... | 396/90 |
| 2012/0037820 A1 | 2/2012 | Komi | |

FOREIGN PATENT DOCUMENTS

| | | |
|---|---|---|
| JP | 2006-277481 A | 10/2006 |
| JP | 2010-182057 A | 8/2010 |
| JP | 2010-262247 A | 11/2010 |

OTHER PUBLICATIONS

Japanese Office Action dated Dec. 25, 2012 (and English translation thereof) in counterpart Japanese Application No. 2011-074768.

* cited by examiner

*Primary Examiner* — Michael G Lee
*Assistant Examiner* — Laura Gudorf
(74) *Attorney, Agent, or Firm* — Holtz, Holtz, Goodman & Chick, PC

(57) ABSTRACT

A code reading apparatus includes: a storage section storing an applied voltage table showing a relationship between a focal distance of a liquid lens and an applied voltage to the liquid lens; a laser focus section performing laser focus adjustment; a contrast focus section performing contrast focus adjustment; and a correction section correcting a content of the applied voltage table based on a distance from the liquid lens to a subject found by the laser focus section and a corresponding applied voltage with which the subject is brought into focus by the contrast focus section.

8 Claims, 12 Drawing Sheets

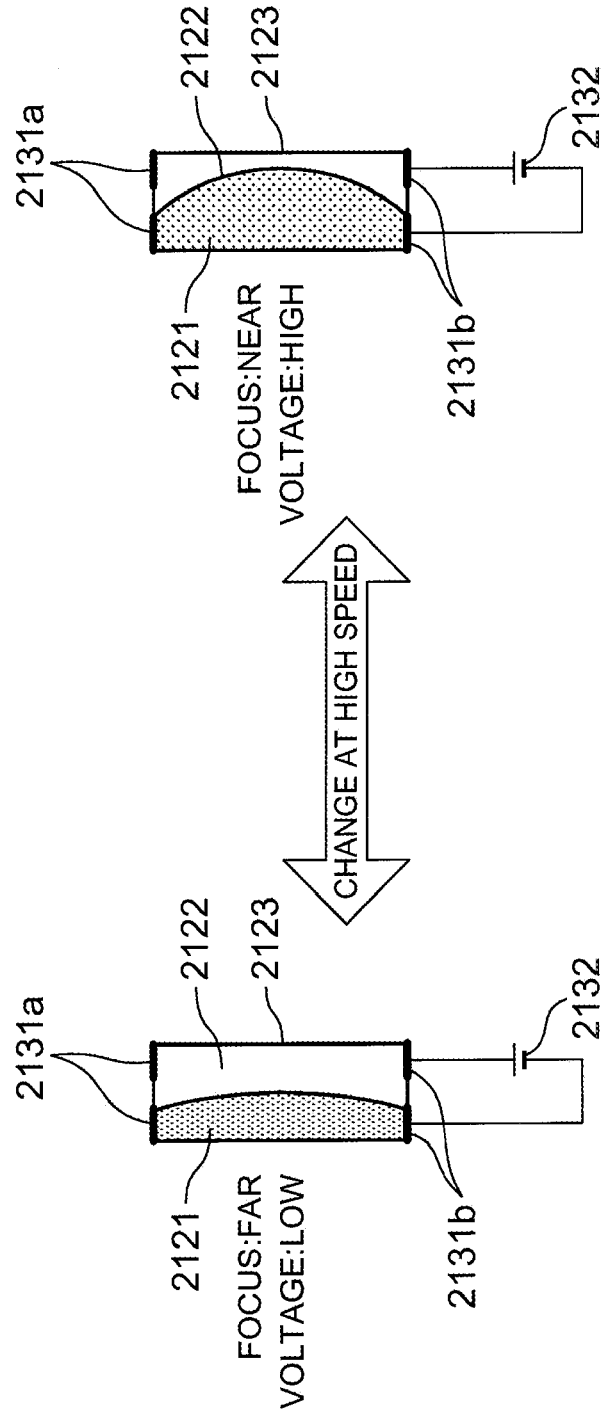

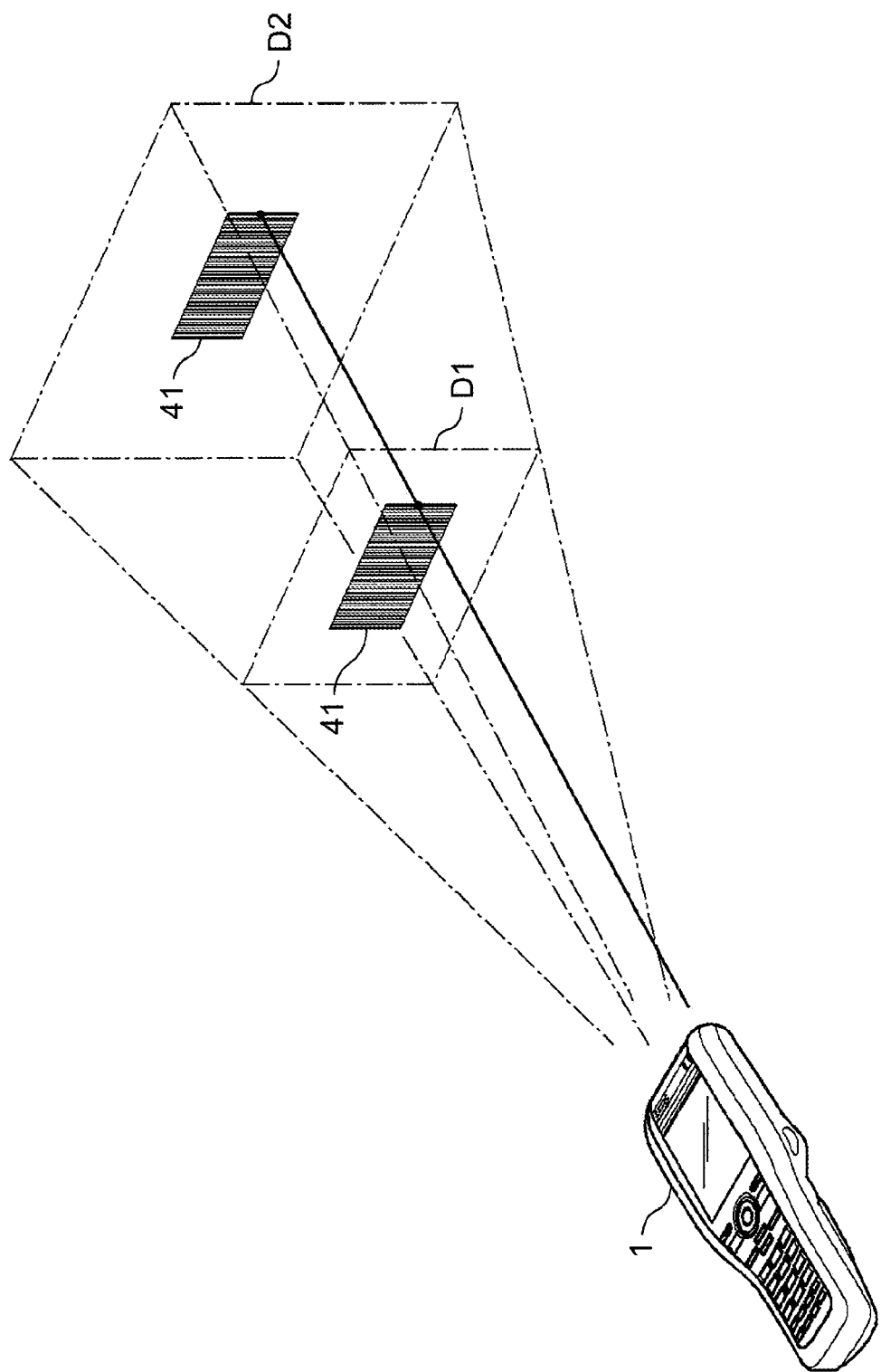

| POSITION OF BRIGHT POINT | FOCAL DISTANCE | APPLIED VOLTAGE |
|---|---|---|
| X1 | D1 | V1 |
| X2 | D2 | V2 |
| ⋮ | ⋮ | ⋮ |
| Xn | Dn | Vn |
| (FOR ADDITIONAL WRITING) | (FOR ADDITIONAL WRITING) | (FOR ADDITIONAL WRITING) |
| ⋮ | ⋮ | ⋮ |

| FOCAL DISTANCE | APPLIED VOLTAGE |
|---|---|
| Dn+1 | Vn+1 |
| D2 | V2 |
| ⋮ | ⋮ |
| Dn | Vn |

152b

| FOCAL DISTANCE | APPLIED VOLTAGE |
|---|---|
| D1 | V1 |
| ⋮ | ⋮ |
| Dk-1 | Vk-1 |
| Dn+1 | Vn+1 |
| Dk+1 | Vk+1 |
| ⋮ | ⋮ |
| Dn | Vn |

| FOCAL DISTANCE | APPLIED VOLTAGE |
|---|---|
| D1 | V1 |
| ... | ... |
| Dk-1 | Vk-1 |
| Dk | VMk |
| Dk+1 | VMk+1 |
| ... | ... |
| Dn | Vn |

| FOCAL DISTANCE | APPLIED VOLTAGE |
|---|---|
| D1 | $V_1 + \alpha_1 \Delta V$ |
| ... | ... |
| Dk-1 | $V_{k-1} + \alpha_{k-1} \Delta V$ |
| Dk | $V_k + \alpha_k \Delta V$ |
| Dk+1 | $V_{k+1} + \alpha_{k+1} \Delta V$ |
| ... | ... |
| Dn | $V_n + \alpha_n \Delta V$ |

CODE READING APPARATUS AND COMPUTER PROGRAM PRODUCT

BACKGROUND OF THE INVENTION

1. Field of the Invention

The present invention relates to a code reading apparatus and a computer program product.

2. Background Art

Conventionally, there is known a code reading apparatus which decodes a symbol such as a one-dimensional barcode or a two-dimensional code to obtain information. In the code reading apparatus, a two-dimensional imager device is installed. The two-dimensional imager device optically picks up (captures) an image of a symbol, and decodes the symbol based on the picked-up image so as to obtain data.

In recent years, such a code reading apparatus uses a liquid lens which is small and light and can change its focal distance (focal length) at high speed, as disclosed by Japanese Patent Application Laid-Open Publication No. 2010-182057, for example. The focal distance of the liquid lens is changed by applying an applied voltage to the liquid lens. Consequently, the code reading apparatus need not have a drive component such as a motor, and durability thereof increases, accordingly.

Furthermore, various technologies have been developed, the technologies by which a symbol as a reading subject for a code reading apparatus is automatically and accurately brought into focus with a liquid lens. For example, Japanese Patent Application Laid-Open Publication No. 2010-262247 discloses a technology by which the focus of a liquid lens is accurately maintained on a reading subject by obtaining a relationship between the applied voltage to the liquid lens and the focal distance thereof in advance and keeping a table of the obtained relationship, and also keeping a correction table for the applied voltage, the correction table being created by taking the influence of the ambient temperature of the liquid lens into account.

However, a liquid lens has a problem that the properties of liquids thereof gradually change. Consequently, the relationship between the focal distance of a liquid lens and the applied voltage thereto changes as time passes. Therefore, when a table of the initial relationship between the focal distance and the applied voltage is kept and used, a problem arises that as time passes, the focus of the liquid lens cannot be maintained on a reading subject, little by little.

SUMMARY OF THE INVENTION

An object of the present invention is to maintain the accuracy of automatic focusing and the speed thereof.

According to a first aspect of the present invention, there is provided a code reading apparatus including: a liquid lens; a focus drive section which applies an applied voltage to the liquid lens to adjust a focal distance of the liquid lens; a storage section which stores an applied voltage table showing a relationship between the focal distance of the liquid lens and the applied voltage to the liquid lens; an image pickup section which obtains image data in an image pickup direction in which the liquid lens faces; a light emitting section which emits a laser light beam in the image pickup direction; a laser focus section which makes the image pickup section obtain image data of a subject in a state in which the laser light beam is emitted, and finds a distance from the liquid lens to the subject based on a position of a bright point formed by the laser light beam in the obtained image data, so as to perform laser focus adjustment; a contrast focus section which makes the image pickup section obtain image data of the subject while changing the focal distance of the liquid lens within a preset change range, so as to perform contrast focus adjustment such that the subject is brought into focus based on a magnitude of contrast of the subject included in the obtained image data; and a correction section which corrects a content of the applied voltage table based on the distance from the liquid lens to the subject found by the laser focus section and a corresponding applied voltage with which the subject is brought into focus by the contrast focus section.

According to a second aspect of the present invention, there is provided a computer program product having a command to perform computer processing encoded, the command readable by a computer of a code reading apparatus including: a liquid lens; a focus drive section which applies an applied voltage to the liquid lens to adjust a focal distance of the liquid lens; an image pickup section which obtains image data in an image pickup direction in which the liquid lens faces; and a light emitting section which emits a laser light beam in the image pickup direction, the computer processing including: (i) storing an applied voltage table showing a relationship between the focal distance of the liquid lens and the applied voltage to the liquid lens; (ii) obtaining image data of a subject by the image pickup section in a state in which the laser light beam is emitted, and finding a distance from the liquid lens to the subject based on a position of a bright point formed by the laser light beam in the obtained image data, so as to perform laser focus adjustment; (iii) obtaining image data of the subject by the image pickup section while changing the focal distance of the liquid lens within a preset change range, so as to perform contrast focus adjustment such that the subject is brought into focus based on a magnitude of contrast of the subject included in the obtained image data; and (iv) correcting a content of the applied voltage table based on the distance from the liquid lens to the subject found in the (ii) and a corresponding applied voltage with which the subject is brought into focus in the (iii).

BRIEF DESCRIPTION OF THE DRAWINGS

FIG. 4 shows change of the focal position of a liquid lens of the code reading apparatus;

FIG. 5 shows that a symbol is disposed at a first position and a second position further than the first position;

FIG. 7 is a focus table in accordance with the embodiment;

FIG. 10 is a focus table for explaining correction of a focus table in accordance with a first modification of the present invention;

FIG. 12A is a focus table for explaining correction of a focus table in accordance with a third modification of the present invention; and FIG. 12B is a focus table for explaining correction of a focus table in accordance with a fourth modification of the present invention.

DETAILED DESCRIPTION OF THE PREFERRED EMBODIMENT

Embodiment

In the following, an embodiment of the present invention is described in detail with reference to the accompanying drawings.

Figure 1:
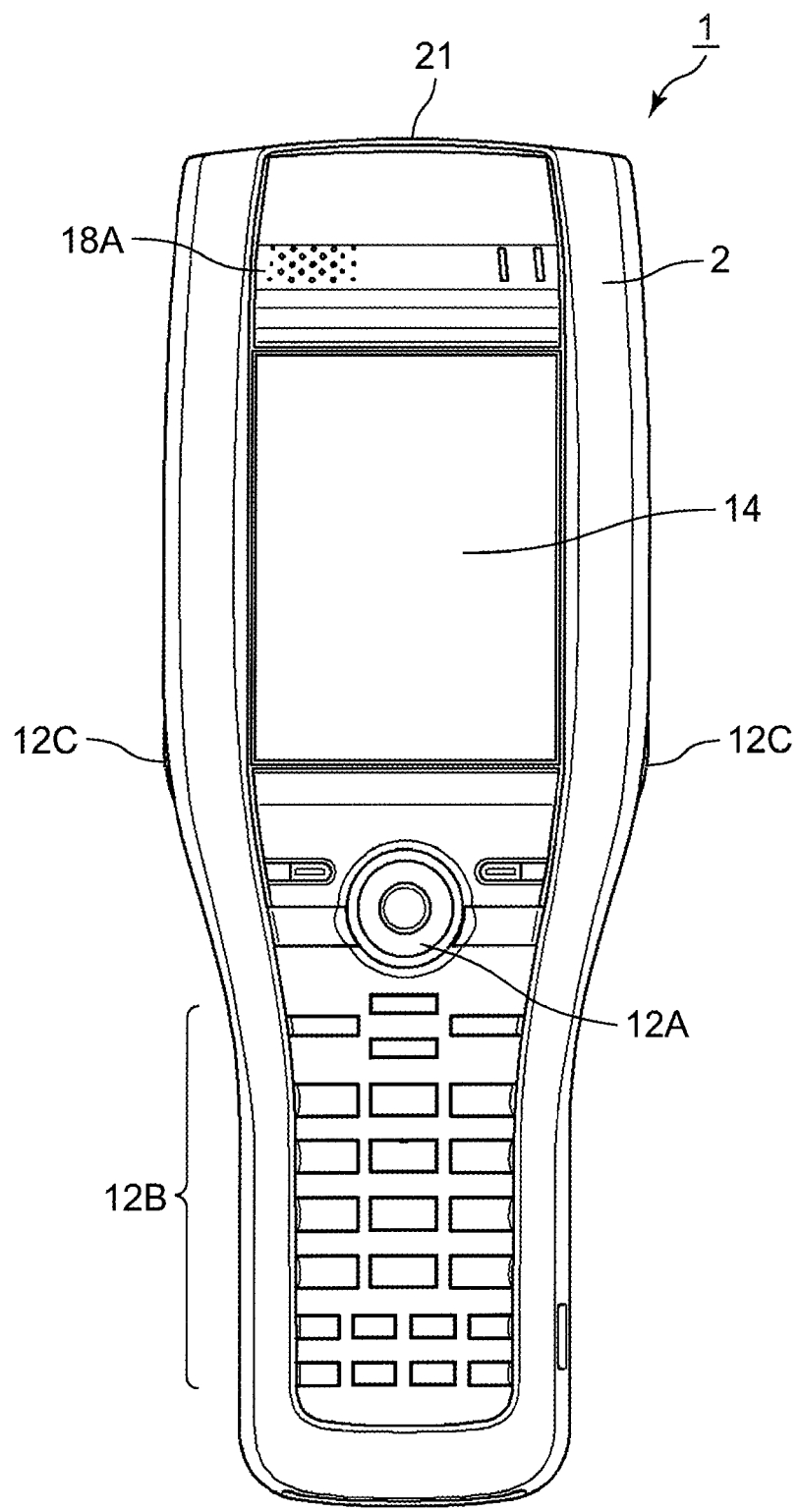
FIG. 1 is a front view of the overall configuration of a code reading apparatus in accordance with an embodiment of the present invention.

FIG. 1 is a front view of the overall configuration of a code reading apparatus in accordance with an embodiment of the present invention.

A code reading apparatus (computer) 1 in the embodiment is a portable device having a function to read a symbol such as a one-dimensional barcode or a two-dimensional code. The code reading apparatus 1 can input information therein, transmit and receive information, and store information therein.

The code reading apparatus 1 includes a case 2. The code reading apparatus 1 has a trigger key 12A, various keys 12B, a display section 14 and a speaker 18A on the front face of the case 2, a trigger key 12C on the lateral face of the case 2, and an imager module 21 on the top end of the case 2.

The trigger keys 12A and 12C receive input of a start command to start an operation to read a symbol (symbol reading operation) performed by the imager module 21. The various keys 12B include: input keys to input numbers, letters or the like; and function keys, and receive input operations to input various pieces of information. The display section 14 displays information on a menu, a status and the like related to the input operations. The display section 14 also displays information on a status, a decoding result and the like when the symbol reading operation is performed by the imager module 21. The speaker 18A outputs a sound to express an operation state of the code reading apparatus 1 and a buzzer sound to notify success of symbol reading (decoding).

Figure 2:
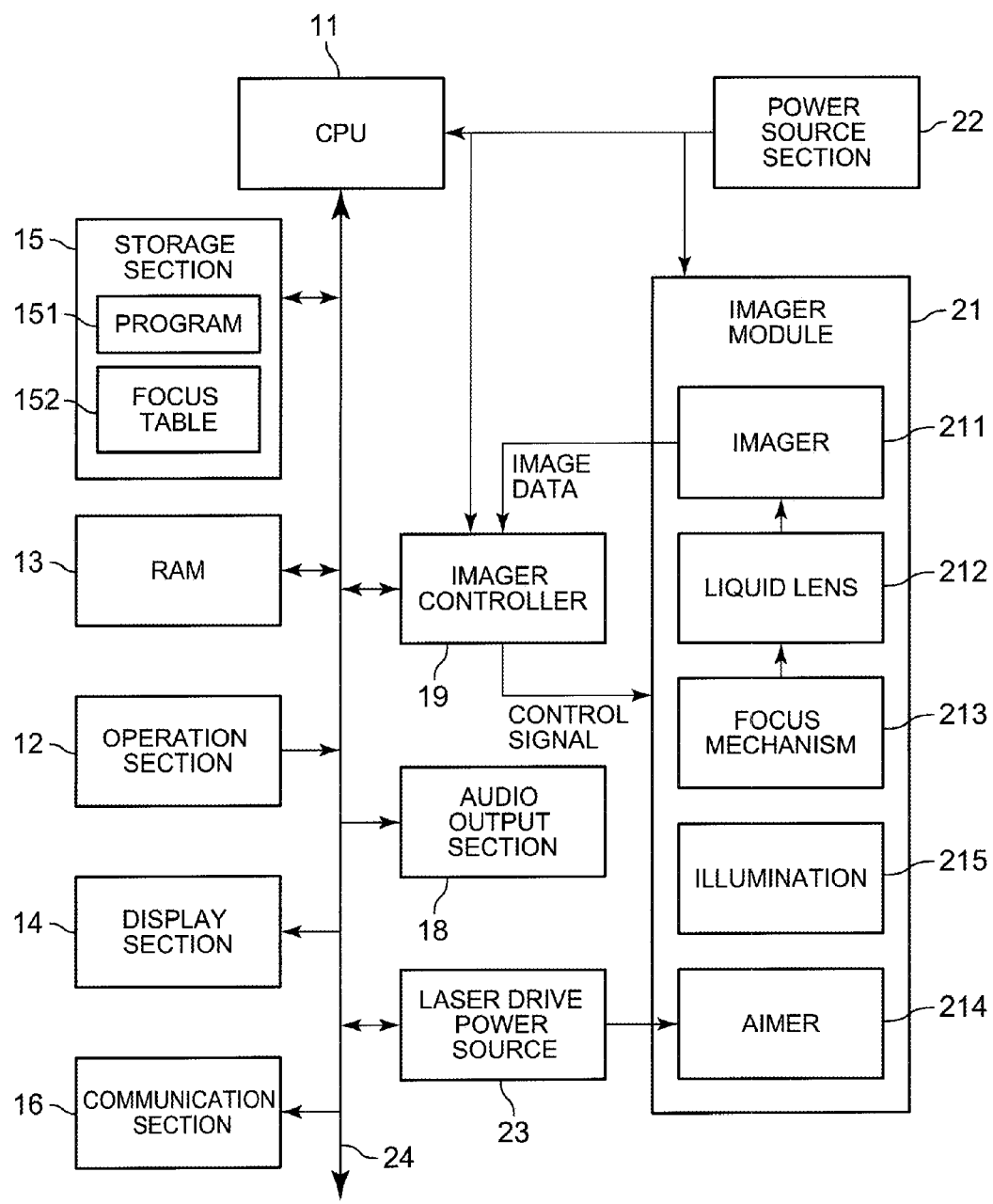
FIG. 2 is a block diagram showing the internal configuration of the code reading apparatus.

FIG. 2 is a block diagram showing the internal configuration of the code reading apparatus 1.

The code reading apparatus 1 includes a CPU (Central Processing Unit) 11 (a laser focus section, a contrast focus section, and a correction section), an operation section 12, a RAM (Random Access Memory) 13, the display section 14, a storage section 15, a communication section 16, an audio output section 18, an imager controller 19, the imager module 21, a power source section 22, and a laser drive power source 23.

The above-described sections and the like of the code reading apparatus 1 except for the imager module 21 and the power source section 22 are connected with each other via a bus 24, and disposed on a main substrate. The imager module 21 includes an imager 211 as an image pickup section, a liquid lens 212, a focus mechanism 213 as a focus drive section which drives the liquid lens 212 to adjust the focus thereof, an aimer 214 as a light emitting section, and an illumination 215 as an illuminating section.

The CPU 11 controls the sections and the like of the code reading apparatus 1. The CPU 11 reads various programs from the storage section 15 to load the programs into the RAM 13, and perform various types of processing in cooperation with the programs loaded into the RAM 13.

The operation section 12 includes the key set of the various keys 12B and the trigger keys 12A and 12C. The operation section 12 receives a press operation of each key of the key set, converts operation information on the press operation into an input signal, and outputs the signal to the CPU 11.

The RAM 13 is a volatile semiconductor memory, and provides a work memory space for the CPU 11. The RAM 13 is used for temporal storage of various data and for loading of various programs so that the programs are executed.

The display section 14 is constituted of an LCD (Liquid Crystal Display), an EL (Electro-Luminescent) display or the like, and displays various pieces of information in accordance with display information inputted from the CPU 11.

The storage section 15 is a nonvolatile read/write memory. For example, the storage section 15 is a flash memory. In the storage section 15, various programs and setting data are stored in advance. The storage section 15 may be an EEPROM (Electrically Erasable and Programmable Read Only Memory) or a hard disk. The storage section 15 may have a ROM (Read Only Memory) as a read-only storage section. The programs stored in the storage section 15 include a program 151 to control operations of the focus mechanism 213 such that a symbol is brought into focus and read. The CPU 11 loads the program 151 into the RAM 13 to perform symbol reading control processing described below.

In the storage section 15, a focus table (applied voltage table) 152 is also stored. The focus table 152 shows a relationship between the focal distance of the liquid lens 212 of the imager module 21 and the applied voltage applied to the liquid lens 212 by the focus mechanism 213 which adjusts the focal distance of the liquid lens 212.

The communication section 16 includes a communication antenna, a signal processing section, a modulation section and a demodulation section, and wirelessly communicates with an access point. The access point is a device to relay communications. That is, with the communication section 16, the code reading apparatus 1 communicates with an external apparatus such as a server apparatus via the access point, the external apparatus being connected to the access point. The communication section 16 processes a signal of transmission information with the signal processing section, and modulates the signal with the modulation section so as to wirelessly transmit the transmission information as a radio wave from the communication antenna to the access point. Furthermore, the communication section 16 receives a radio wave transmitted from the access point with the communication antenna, demodulates the radio wave with the demodulation section, and processes a signal thereof with the signal processing section so as to obtain reception information.

The communication section 16 may be a wireless communication section which performs wireless communications with the server apparatus via a station by a mobile phone communication system. Alternatively, the communication section 16 may be a wire communication section which performs wire communications with the server apparatus via a cradle where the code reading apparatus 1 is placed or a communication cable.

The audio output section 18 includes an audio source section, an amplifier and the speaker 18A, and outputs a buzzer sound when symbol decoding succeeds. In accordance with an instruction inputted from the CPU 11 to output a buzzer sound, the audio output section 18 generates a signal of the buzzer sound with the audio source section, amplifies the signal with the amplifier, and converts the signal into a sound so as to output the sound from the speaker 18A.

The imager controller 19 controls operations of the imager module 21, performs mathematical operation based on image data outputted from the imager module 21, and performs control processing. The imager controller 19 is constituted of a semiconductor circuit such as an ASIC (Application Specific Integrated Circuit).

Into the imager controller 19, a frame synchronizing signal, a line synchronizing signal and a clock signal are inputted from the imager 211. The frame synchronizing signal indicates output timing of one frame of captured image data. The line synchronizing signal indicates output timing of one line of the image data. The clock signal indicates output timing of the image data. The imager controller 19 monitors transfer timing of image data to the RAM 13 based on the frame synchronizing signal, the line synchronizing signal and the clock signal. The imager controller 19 controls operations of the focus mechanism 213 in accordance with the monitoring state so as to change the focus of the liquid lens 212 in real time.

The imager controller 19 has a DMA (direct Memory Access) transfer function. With the DMA transfer function, the imager controller 19 directly transfers image data inputted from the imager 211 to the RAM 13 by DMA.

The imager module 21 picks up an image of a code symbol by adjusting the focal distance of the liquid lens 212. Although not particularly being limited, the imager 211 is a CMOS (Complementary Metal Oxide Semiconductor) image sensor. The imager 211 photoelectrically converts a subject image, which enters the imager 211 via an optical system including the liquid lens 212, into an electric signal so as to obtain image data.

The imager 211 outputs, to the imager controller 19, image data for lines specified by an image region specification signal inputted from the imager controller 19 as line data one line by one line. Also, the imager 211 outputs the frame synchronizing signal, the line synchronizing signal and the clock signal to the imager controller 19.

The liquid lens 212 is an optical element which constitutes the optical system of the imager module 21. The focus mechanism 213 is the focus drive section which adjusts the focal position of the liquid lens 212. The liquid lens 212 and the focus mechanism 213 are described in detail below.

The aimer 214 is an LD (Laser Diode) which emits a laser light beam as spot light (target light). The spot light is a measurement indicator for a distance between the imager module 21 and a symbol as a subject, and a reference for making a direction in which the imager module 21 faces (image pickup direction) suitable to a direction in which a subject exists (subject direction). The shape of a bright point formed in a plane where the laser light beam is casted is not particularly limited, but it is preferable to be symmetry across its center. Hence, the shape of the bright point may be a round. The illumination 215 is constituted of a light source such as an LED (Light Emitting Diode), and outputs irradiation light for illuminating a subject and an area around the subject (subject area).

The power source section 22 is constituted of a secondary battery or the like, and supplies electric power to each section or the like of the code reading apparatus 1. The laser drive power source 23 supplies electric power for driving the aimer 214 to emit the spot light.

Figure 3:
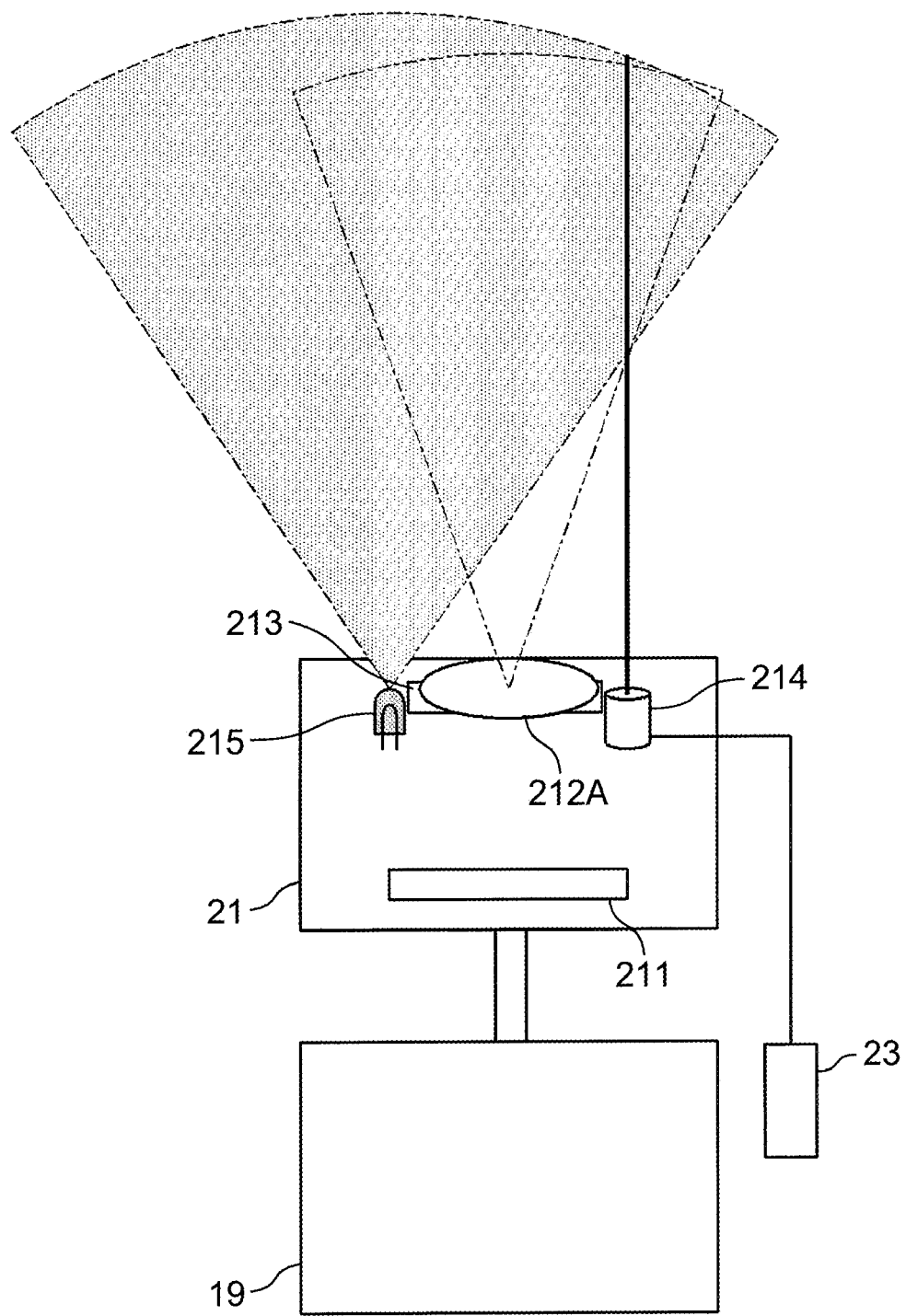
FIG. 3 is a plan view of an imager module and an imager controller of the code reading apparatus.

Next, disposition of the components of the imager module 21 is described in detail with reference to FIG. 3. FIG. 3 is a plan view of the imager module 21.

In the imager module 21, an optical system 212A including the liquid lens 212 is disposed in such a way as to be able to pick up images of the outside of the imager module 21. The imager 211 is disposed perpendicularly to the optical axis of the optical system 212A, and light from the optical system 212A enters the imager 211. The aimer 214 and the illumination 215 are disposed almost in a line with the optical system 212A and the focus mechanism 213. The aimer 214 is disposed in such a way that the laser light beam is included in an angle of view where the imager 211 can pick up an image (image pickup available extent), within the focal distance changeable with respect to the optical system 212A. In the embodiment, the laser light beam is emitted in a direction parallel to the optical axis of the optical system 212A. The illumination 215 is disposed in such a way that the irradiation light, which illuminates an area in the shape of a fan, illuminates the angle of view where the imager 211 can pick up an image (image pickup available extent), within the focal distance changeable with respect to the optical system 212A.

Next, the configuration of the liquid lens 212, the configuration of the focus mechanism 213 and change of the focal distance are described. FIG. 4 shows change of the focal distance of the liquid lens 212.

The liquid lens 212 includes liquids 2121 and 2122, and a container 2123. The liquids 2121 and 2122 are aqueous solution and oil which are different in the refractive index and the same in the specific gravity. The container 2123 contains the liquids 2121 and 2122 therein airtightly.

Electrodes 2131a and 2131b of the focus mechanism 213 are disposed in the vicinities of the liquids 2121 and 2122 to apply a voltage to the liquid lens 212. A power source 2132 is connected between the electrodes 2131a and 2131b on the liquid 2121 side and the electrodes 2131a and 2131b on the liquid 2122 side. By the power source 2132, a voltage is applied between the electrodes 2131a and 2131b on the liquid 2121 side and the electrodes 2131a and 2131b on the liquid 2122 side. Consequently, the interface between the liquids 2121 and 2122 is curved to be a lens, and a function as a lens can be realized accordingly. As the applied voltage by the power source 2132 becomes higher, the interface between the liquids 2121 and 2122 curves more. When the interface curves little, the focal distance of the liquid lens 212 is long, and when the interface curves much, the focal distance of the liquid lens 12 is short.

Because the lens curvature of the liquid lens 212 changes in accordance with the applied voltage to the liquid lens 212, unlike a conventional mechanical autofocus mechanism, physical movement of the liquid lens 212 does not occur. Accordingly, the lens curvature of the liquid lens 212 can be changed electrically at high speed. Thus, focus adjustment of the liquid lens 212 can be performed by changing the lens curvature by adjusting the applied voltage. Furthermore, although the applied voltage level is high (namely, a high voltage), current does not flow. Accordingly, electric power consumption is low.

In the liquid lens 212, the viscosities of the aqueous solution and oil as the liquids 2121 and 2122 influence the curvature of the interface. Consequently, when the viscosities of aqueous solution and oil change because of the aging thereof, the same curvature cannot be obtained even if the same voltage is applied thereto.

Next, focus adjustment methods of the optical system 212A are described. In the embodiment, two types of focus adjustment methods, namely, a laser focus method and a contrast focus method, are used.

Figure 6A:
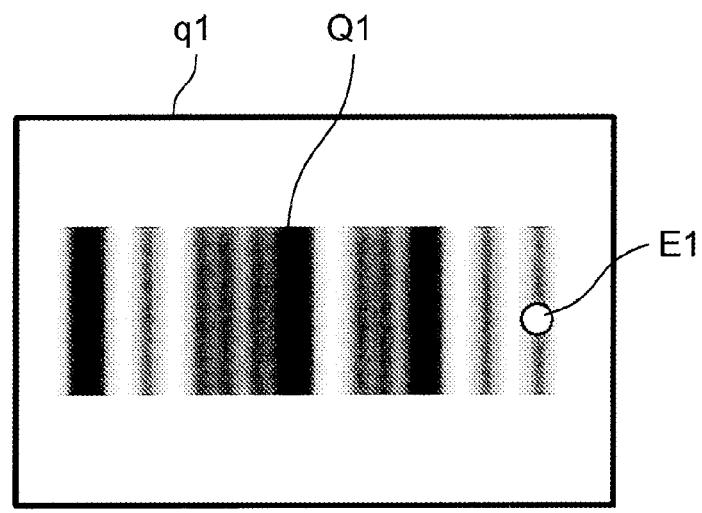
FIG. 6A shows a frame image obtained by picking up an image of the symbol disposed at the first position.
Figure 6B:
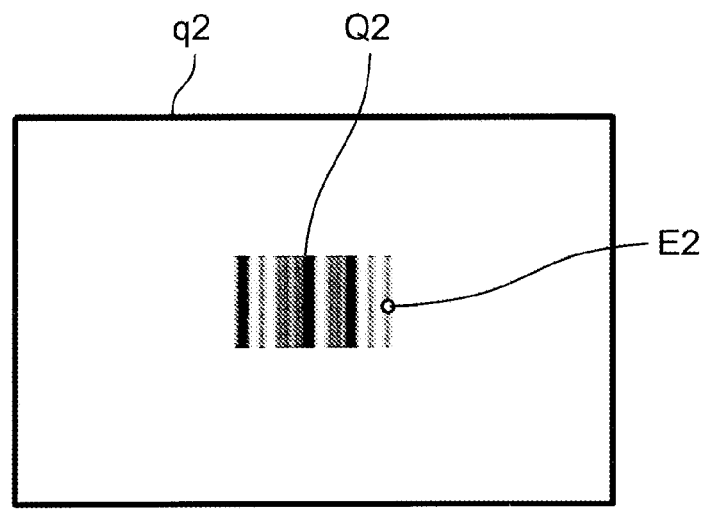
FIG. 6B shows a frame image obtained by picking up an image of the symbol disposed at the second position.

First, the laser focus method is described. FIG. 5 shows that a symbol is disposed at a first position and a second position further than the first position. FIGS. 6A and 6B are frame images obtained by picking up images of the symbol disposed at the first position and the second position, respectively. FIG. 7 is an example of a focus table in which the focal distance and other parameters are correlated with each other.

As shown in FIG. 5, when a plane on which a symbol 41 of a one-dimensional barcode is displayed is disposed at a first position D1, as shown in FIG. 6A, an image Q1 of the symbol 41 is obtained in a frame image q1. At the time, a laser light beam is emitted from the aimer 214, and reaches the plane of the symbol 41, so as to form a bright point in the plane. In FIG. 6A, a bright point E1 is formed near the right end of the image Q1 of the symbol 41.

Although not particularly being limited, the barcode symbol 41 is printed, for example, on plain paper. When a two-dimensional code or the like other than a one-dimensional barcode is read too, processing using a similar focus adjustment method is performed.

On the other hand, as also shown in FIG. 5, when a plane on which the symbol 41 is displayed is disposed at a second position D2 which is further than the first position D1 from the imager module 21, as shown in FIG. 6B, an image Q2 of the symbol 41 is obtained in a frame image q2. The area of the image Q2 of the symbol 41 in the area of the frame image q2 is relatively smaller than the area of the image Q1 of the symbol 41 in the area of the frame image q1. At the time, a laser light beam is emitted from the aimer 214, and illuminates near the right end of the symbol 41. Then, the position of a bright point E2 in the frame image q2 is closer to the center of the frame image q2 as compared with the position of the bright point E1 in the frame image q1.

That is, in a frame image, an image pickup area obtained by the optical system 212A and the imager 211 with respect to a same subject (code symbol), the image pickup area where an image of the subject is picked up, becomes smaller approximately at the inverse square of the distance from the imager module 21 to the subject. Furthermore, in a frame image, the distance from the center thereof to the position of a bright point formed by the laser light beam becomes shorter approximately in inverse proportion to the distance from the imager module 21 to the subject (symbol 41), so that the bright point gradually gets closer to the center of the frame image. Consequently, the distance from the imager module 21 (liquid lens 212) to the symbol 41, namely, a target focal distance of the liquid lens 21 to be set by the imager module 21 can be found from the position (coordinates) of a bright point in a frame image.

The target focal distance may be found by using, as shown in FIG. 7, the focus table 152 in which the coordinates of the bright point and the focal distance are stored, or may be calculated each time needed by executing a program which carries out mathematical operation based on a numerical formula.

In the laser focus method, based on the above-described principle, the aimer 214 is lightened up (turned on) so that a frame image is obtained, the coordinates of a bright point in the frame image are identified, and the target focal distance is found based on the coordinates of the bright point. At the time, if the distance from the imager module 21 to the bright point does not match the focal distance of the liquid lens 212, an image of the bright point becomes unclear. Even in such a case, the coordinates of the bright point can be found by finding the centroid point of a light part produced by the detected bright point. Thus, as long as light is emitted from the aimer 214 and a bright point formed on a subject is included in a frame image, the target focal distance can be found by one image-pickup, namely, within a short period of time.

When the target focal distance is found, the focus table 152 is referred to, and as shown in FIG. 7, an applied voltage (provisional corresponding applied voltage) for the target focal distance is found. When the target focal distance does not match focal distance data stored in the focus table 152, an applied voltage for the target focal distance is found, for example, by linear interpolation. By applying this applied voltage to the liquid lens 212 with the focus mechanism 213, the focal distance of the liquid lens 212 is adjusted to the target focal distance.

Figure 8A:
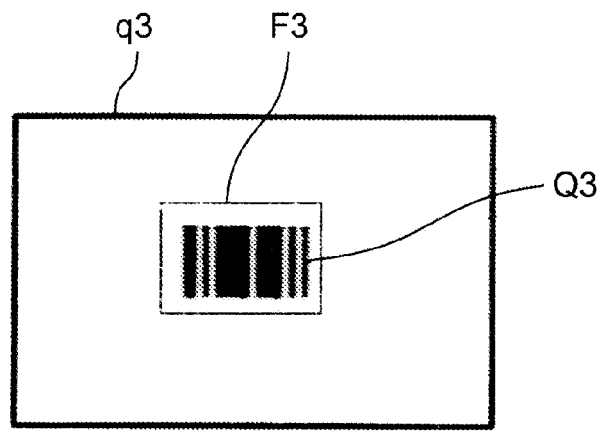
FIG. 8A is a frame image obtained by picking up an image of the symbol disposed at the second position when the focal position is equal to the first position.
Figure 8B:
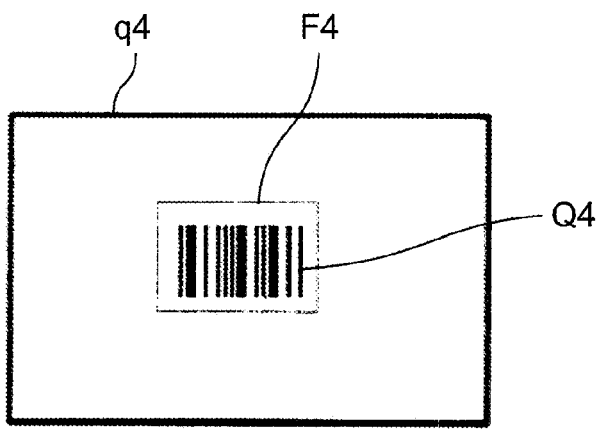
FIG. 8B is a frame image obtained by picking up an image of the symbol disposed at the second position when the focal position is equal to the second position.

Next, the contrast focus method is described. FIG. 8A is a frame image obtained by picking up an image of the symbol disposed at the second position when the focal distance of the liquid lens 212 is equal to the distance from the liquid lens 212 of the imager module 21 to the first position. FIG. 8B is a frame image obtained by picking up an image of the symbol disposed at the second position when the focal distance of the liquid lens 212 is equal to the distance from the liquid lens 212 of the imager module 21 to the second position.

When the symbol 41 of a one-dimensional barcode is disposed at the second position D2 in FIG. 5, the image data obtained when the focus of the liquid lens 212 is superposed on the second position D2 is the clearest. When the focus thereof is in front or behind the second position D2, obtained image data is unclear. For example, as shown in FIG. 8A, when the focus of the liquid lens 212 is on the first position D1, the focal distance of the liquid lens 212 is shorter than the distance from the liquid lens 212 of the imager module 21 to the second position D2 where the symbol 41 is disposed. Consequently, a barcode image Q3 in a frame image q3 is unclear overall. As a result, in a predetermined region F3 including the barcode image Q3, the contrast between a space part which is a light part of the barcode symbol 41 and a bar part which is a dark part thereof becomes small. On the other hand, as shown in FIG. 8B, when the focus of the liquid lens 212 is on the second position D2, the outline of a barcode image Q4 in a frame image q4 is clear. Consequently, the light part and the dark part are separated. As a result, in a predetermined region F4 including the barcode image Q4, the contrast therebetween becomes large.

In the contrast focus method, by utilizing the above-described characteristics, the focal distance of the liquid lens 212 to a symbol is determined by obtaining frame image data while changing the applied voltage applied to the liquid lens 212, and calculating a contrast value of the contrast for each frame image so as to find a value of the applied voltage with which a maximum contrast value is obtained (corresponding applied voltage). Consequently, independently from the relationship between the applied voltage and the focal distance stored in the focus table 152, an applied voltage (corresponding applied voltage) with which a symbol is brought into focus is found.

Although not particularly being limited, as a calculated contrast value, for example, an MRD (Minimum Reflectance Difference) value is used. The MRD value is found from the difference between the minimum reflectance of the space part as the light part and the maximum reflectance of the bar part as the dark part. A contrast value is calculated by extracting data of the region F3 or F4 shown in FIG. 8A or 8B from its frame image data. The region F3 or F4 is set, for example, near the center of the frame image q3 or q4, so that the proportion of a region other than the barcode image Q3 or Q4 in the frame image q3 or q4 is reduced. It is not always necessary that the region F3 or F4 is set to include the entire barcode image Q3 or Q4.

Figure 8C:
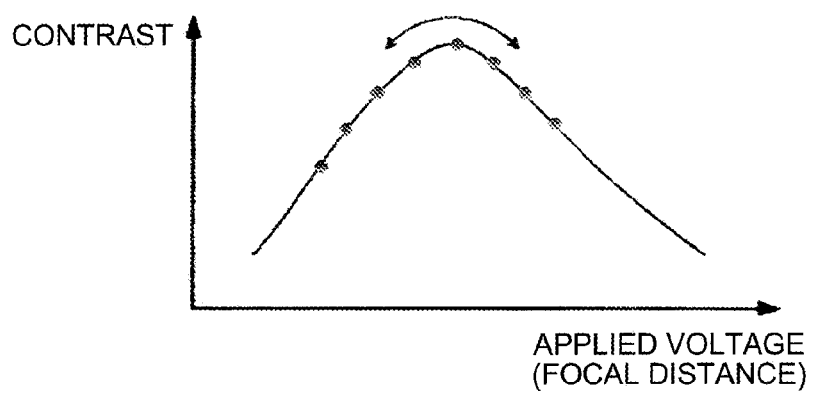
FIG. 8C is a graph showing change of contrast of the symbol when the focal position is changed.

FIG. 8C shows an example of a change pattern of the contrast when the applied voltage to the liquid lens 212 (focal distance of the liquid lens 212) is changed successively by the focus mechanism 213 in the imager module 21.

In the embodiment, the applied voltage is changed on a predetermined voltage basis (voltage change interval) so that frame images are obtained while the focus is shifted back or forth within a preset change range of the applied voltage, and a contrast value of a region set in each frame image is found successively. When a barcode image exists in the set region in each obtained frame image, at some point, a found contrast value is the maximum contrast value (local maximum contrast value). The focal distance of the liquid lens 212 for an applied voltage with which the maximum contrast value is obtained is expected to be proximate to the distance from the liquid lens 212 to the position where the barcode symbol is disposed. Therefore, in the contrast focus method, decoding of a barcode symbol is performed using frame image data obtained by applying an applied voltage with which the maximum contrast value is obtained to the liquid lens 212, and picking up an image of the symbol again.

Next, a correction operation of the focal distance in the embodiment is described.

Figure 9:
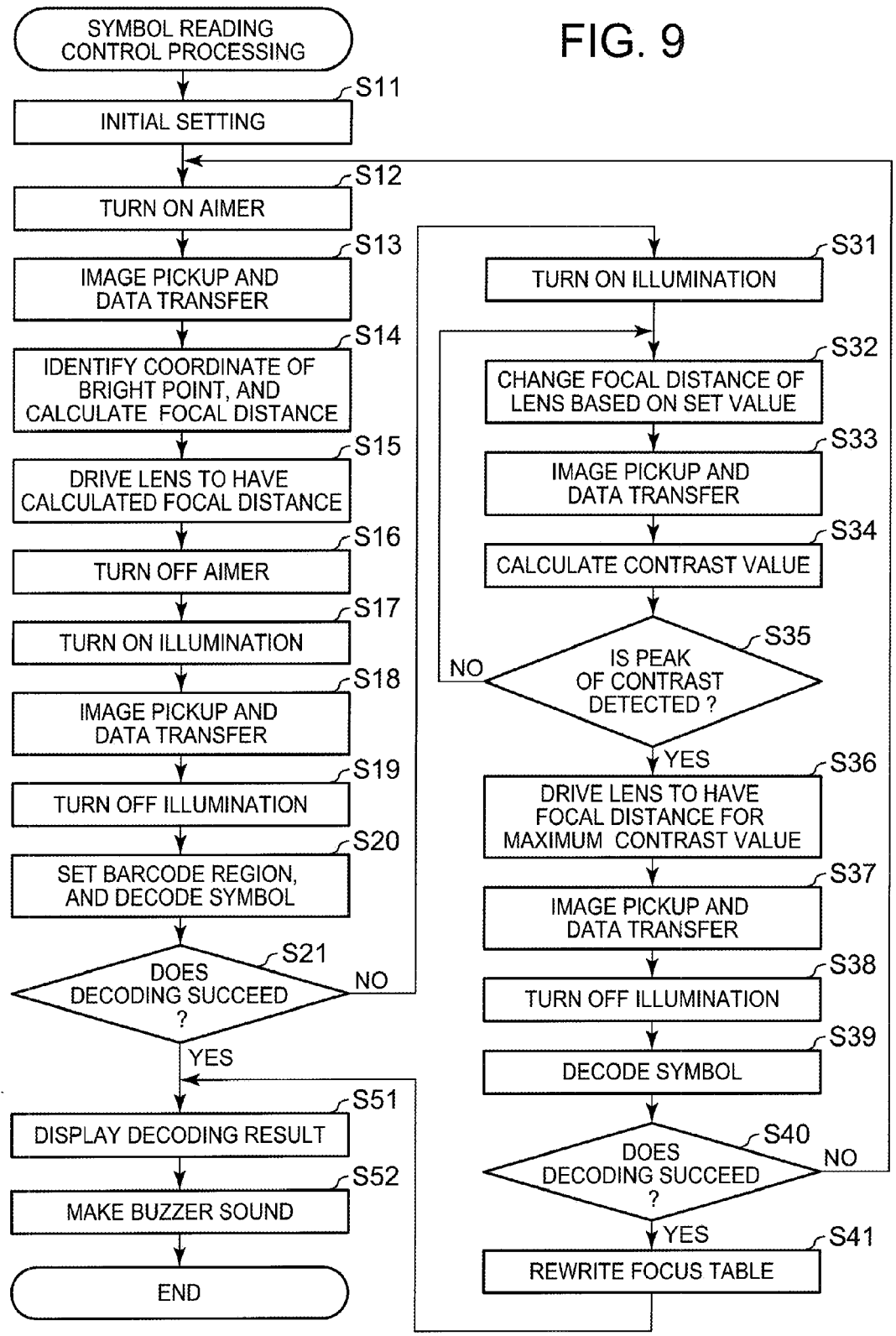
FIG. 9 is a flowchart of symbol reading control processing in accordance with the embodiment.

FIG. 9 is a flowchart of symbol reading control processing performed by the CPU 11 in the embodiment.

The symbol reading control processing performed by the CPU 11 includes correction of the focus table 152. The focus table 152 is corrected when, in conventional symbol reading, a symbol cannot be brought into focus by the focus adjustment with the laser focus method using the focus table 152.

When the symbol reading control processing is started, for example, by a user's operation of a trigger key, the CPU 11 performs initial setting (Step S11). More specifically, the initial setting includes setting and starting electric power supply to the laser drive power source 23 and the imager module 21 (focus mechanism 213), and setting the focal distance of the liquid lens 212 to its initial value.

Next, the CPU 11 starts focus adjustment with the laser focus method. More specifically, the CPU 11 transmits a command to the laser drive power source 23 to turn on the aimer 214 (Step S12). The CPU 11 transmits a command to the imager controller 19 to make the imager 211 pick up (capture) an image of a symbol so as to obtain image data of a region which includes a bright point formed by the aimer 214, and to make the imager controller 19 transfer the obtained image data to the RAM 13 by DMA (Step S13).

The CPU 11 identifies the coordinates of the bright point from the image data transferred to and stored in the RAM 13, and calculates a distance from the imager module 21 (liquid lens 212) to the symbol (target focal distance of the liquid lens 212) using the identified coordinates of the bright point (Step S14). The target focal distance may be found by referring to a conversion table stored in the storage section 15, or by using a formula included in the program 151 or in a setting file of the program 151, the setting file being read when the program 151 is executed.

The CPU 11 refers to the focus table 152 to find a value of the applied voltage (provisional corresponding applied voltage) for the target focal distance, and transmits a command to the imager controller 19 to transmit a control signal to the focus mechanism 213, the control signal with which the focus mechanism 213 applies the provisional corresponding applied voltage to the liquid lens 212 (Step S15). Consequently, the focal distance of the liquid lens 212 matches the target focal distance.

Next, the CPU 11 transmits a signal to the laser drive power source 23 to turn off the aimer 214 (Step S16). The CPU 11 transmits a command to the imager controller 19 to turn on the illumination 215 (Step S17). Then, the CPU 11 transmits a command to the imager controller 19 to make the imager 211 pick up an image of the symbol, and to make the imager controller 19 transfer the picked-up frame image data to the RAM 13 by DMA (Step S18). When the frame image data is transferred to the RAM 13, the CPU 11 transmits a command to the imager controller 19 to turn off the illumination 215 (Step S19).

Then, the CPU 11 detects a region of the image of the symbol included in the frame image data stored in the RAM 13 to set the region as a barcode region, and decodes the symbol from the data of the barcode region (Step S20). The CPU 11 judges whether or not decoding of the symbol succeeds (Step S21). When it is judged that decoding thereof succeeds (Step S21; YES), the CPU 11 moves the processing to Step S51. When it is judged that decoding thereof does not succeed (Step S21; NO), the CPU 11 moves the processing to Step S31, and starts focus adjustment with the contrast focus method.

At Step S31, the CPU 11 transmits a command to the imager controller 19 to turn on the illumination 215. Next, the CPU 11 sets the change range of the applied voltage, the voltage change interval and the initial set value of the applied voltage used for the contrast focus method, and transmits a command to the imager controller 19 to change the focal distance of the liquid lens 212 to the set value (Step S32). More specifically, the CPU 11 sets an applied voltage extracted from the focus table 152 for the target focal distance calculated at Step S14 as the median, and sets a range of the median $\pm \alpha$ as the change range of the applied voltage. The CPU 11 sets, for example, the upper limit or the lower limit of the change range as the initial set value, and makes the imager controller 19 operate the focus mechanism 213 to change the focal distance of the liquid lens 212 to the set value.

The CPU 11 transmits a command to the imager controller 19 to make the imager 211 pick up an image of the symbol with this focal distance. Then, the CPU 11 makes the imager controller 19 transfer data of a predetermined region of the picked-up image to the RAM 13 by DMA (Step S33). The predetermined region is, for example, the center part of the picked-up frame image. The predetermined region may be different in shape between when a barcode is read and when a two-dimensional code is read, for example, to be a rectangle or a square.

The CPU 11 calculates a contrast value from the image data transferred to and stored in the RAM 13 (Step S34). Then, the CPU 11 judges whether or not the calculated contrast value is the local maximum value (peak) within the change range of the applied voltage (Step S35). When it is judged that the local maximum value is detected (Step S35; YES), the CPU 11 moves the processing to Step S36. When it is judged that the local maximum value is not detected (Step S35; NO), the CPU 11 returns the processing to Step S32. Then, the CPU 11 sets another applied voltage next to the current applied voltage within the change range thereof, and repeats Steps S32 to S35 of the processing.

In order to exclude a situation where the detected contrast value as the local maximum value is not the maximum value, a lowest reference value may be set for the local maximum value. Alternatively, after the detection of the peak, calculation of a contrast value may still be performed a predetermined number of times.

At Step S36, the CPU 11 transmits a command to the imager controller 19 to change the focal distance of the liquid lens 212 based on the applied voltage value with which the local maximum value (maximum value) as a contrast value is detected. Then, the CPU 11 makes the imager controller 19 transmit a control signal to the imager 211 to pick up an image of the symbol with this focal distance, and makes the imager controller 19 transfer data of the whole frame image to the RAM 13 by DMA (Step S37). Then, the CPU 11 transmits a command to the imager controller 19 to turn off the illumination 215 (Step S38).

The CPU 11 decodes the symbol by using the frame image data transferred to the RAM 13 (Step S39). Then, the CPU 11 judges whether or not decoding of the symbol succeeds (Step S40). When it is judged that decoding thereof succeeds (Step S40; YES), the CPU 11 rewrites the focus table 152 based on that applied voltage value and the target focal distance calculated by the laser focus method (Step S41). Then, the CPU 11 moves the processing to Step S51. When it is judged that decoding thereof does not succeed (Step S40; NO), the CPU 11 returns the processing to Step S12, and performs the focus adjustment with the laser focus method again.

At Step S51, the CPU 11 transmits a control signal to the display section 14 to display the decoding result on the display section 14. The CPU 11 transmits a control signal to the audio output section 18 to make a buzzer sound with the speaker 18A (Step S52). Then, the CPU 11 ends the symbol reading control processing.

Next, the rewrite of the focus table 152 at Step S41 is described.

As the properties of the liquids of the liquid lens 212 change over time, the relationship between the focal distance of the liquid lens 212 and the applied voltage to the liquid lends 212 changes gradually. Hence, in the symbol reading control processing, the focus table 152 showing the relationship is corrected as needed.

As described above, when a right focal distance cannot be set by an applied voltage set by the focus adjustment with the laser focus method, an applied voltage for the focal distance is found with the contrast focus method. In order to correct the focus table 152 in the embodiment, the CPU 11 correlates the found applied voltage with the focal distance, and additionally registers the applied voltage and the focal distance in the focus table 152. The focus table 152 in the embodiment includes a memory region for additional registration (additional writing) as shown in FIG. 7, and every time the additional registration is performed, the amount of data set in the focus table 152 increases.

The relationship between the focal distance and the applied voltage gradually changes as time passes. When it becomes impossible to focus on a symbol as a reading subject with the laser focus method any longer, corrected applied voltage data is added one by one, so that the relationship between the focal distance and the applied voltage gradually changes.

In FIG. 7, in addition to the focal distance and applied voltage, the coordinates (position) of the bright point for the focal distance and applied voltage are shown. Hence, when new focal distance data is added to the focus table 152, the coordinates of the bright point for the focal distance are also calculated based on a preset numerical formula, and added to the focus table 152. Alternatively, it is possible that the coordinates of the bright point are not shown in the focus table 152, and have another table therefor, in order to simplify correction processing of the focus table 152.

[First Modification]

FIG. 10 is a focus table for explaining correction of a focus table in accordance with a first modification of the present invention.

In the first modification, when a focus table 152a is corrected, the number of rows in the focus table 152a is fixed, and hence the CPU 11 deletes a row in which old data is stored each time new corrected data is added to the focus table 152a. By deleting, for example, the oldest data stored in the focus table 152a, the focus table 152a having the latest data can be always obtained. In addition, by replacing contents of the focus table 152a in this way, it becomes unnecessary to reserve some capacity of the storage section 15 for correcting the focus table 152a so as to add new data to the focus table 152a.

[Second Modification]

Figures 11A, 11B:
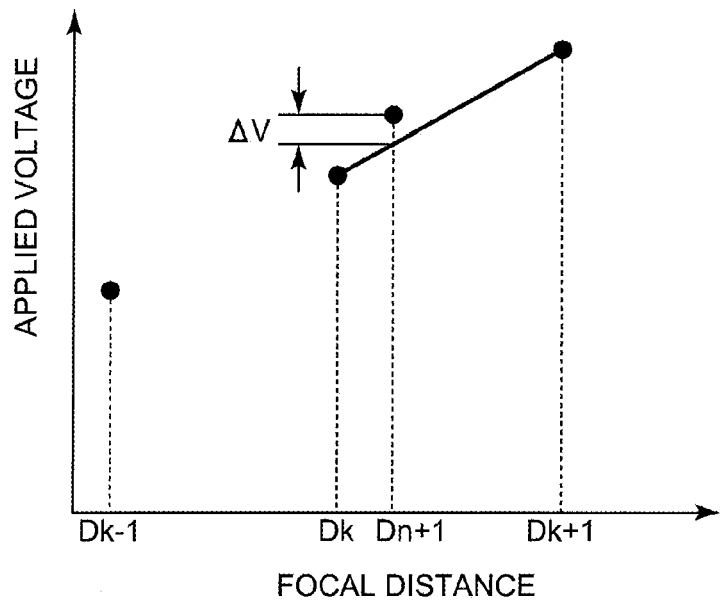
FIG. 11A is a graph for explaining correction of a focus table in accordance with a second modification of the present invention.
FIG. 11B is a focus table for explaining correction of a focus table in accordance with the second modification.

FIG. 11A is a graph and FIG. 11B is a focus table for explaining correction of a focus table in accordance with a second modification of the present invention.

In a focus table 152b in the second modification, when an applied voltage $V_{n+1}$ for a focal distance $D_{n+1}$ between focal distances $D_k$ and $D_{k+1}$ is obtained as corrected data as shown in FIG. 11A, old data to be replaced and deleted may be row data, the focal distance of which is proximate to the focal distance of the corrected data. In FIG. 11B, data of the focal distance $D_k$ which is proximate to the focal distance $D_{n+1}$ is deleted, and data of the new focal distance $D_{n+1}$ is added. By using this replacement method, a focus table can be updated, avoiding a situation in which focal distances in the focus table are unevenly distributed around a particular point as a result of replacement of much data.

[Third Modification]

FIG. 12A is a focus table for explaining correction of a focus table in accordance with a third modification of the present invention.

In a focus table 152c in the third modification, when an applied voltage $V_{n+1}$ for a focal distance $D_{n+1}$ between focal distances $D_k$ and $D_{k+1}$ is obtained as corrected data as shown in FIG. 11A, data of the focal distance $D_{n+1}$ itself is not added to the focus table 152c. Instead, applied voltages for the focal distances $D_k$ and $D_{k+1}$ which are next to the focal distance $D_{n+1}$ are found. For example, the applied voltage for the focal distance $D_k$ is found by performing linear interpolation on an applied voltage $V_{k-1}$ for a focal distance $D_{k-1}$ and the applied voltage $V_{n+1}$, and the applied voltage for the focal distance $D_{k+1}$ is found by performing linear interpolation on an applied voltage $V_{k+2}$ for a focal distance $D_{k+2}$ and the applied voltage $V_{n+1}$. The focal distances $D_{k-1}$ and $D_{k+2}$ are two focal distances away from the focal distance $D_{n+1}$ backward and forward, respectively. Then, as shown in FIG. 12A, the found applied voltages $VM_k$ and $VM_{k+1}$ replace the original applied voltages $V_k$ and $V_{k+1}$, respectively, so that the applied voltages $VM_k$ and $VM_{k+1}$ are stored in the focus table 152c.

[Fourth Modification]

FIG. 12B is a focus table for explaining correction of a focus table in accordance with a fourth modification of the present invention.

In a focus table 152d in the fourth modification, when an applied voltage $V_{n+1}$ for a focal distance $D_{n+1}$ between focal distances $D_k$ and $D_{k+1}$ is obtained as corrected data as shown in FIG. 11A, a difference between an applied voltage for the focal distance $D_{n+1}$ found by performing linear interpolation on applied voltages for the focal distances $D_k$ and $D_{k+1}$ and the applied voltage $V_{n+1}$ for the focal distance $D_{n+1}$ obtained as the corrected data is taken as a voltage difference $\Delta V$. Then, values which are respectively calculated by multiplying the voltage difference $\Delta V$ by predetermined coefficients $\alpha_1$ to $\alpha_n$ are added to their respective applied voltage data (all applied voltage data) stored in the focus table 152d, whereby the focus table 152d is corrected as shown in FIG. 12B. The coefficients $\alpha_1$ to $\alpha_n$ are values which are set, for example, based on distances from the focal distance $D_k$ to each of the focal distances $D_1$ to $D_n$. Alternatively, when the relationship between the focal distance $D_k$ and the applied voltage $V_k$ can be expressed by a numerical formula (including an approximate formula), the coefficients $\alpha_1$ to $\alpha_n$ are set based on the formula.

By the correction methods of the focus tables 152c and 152d, data necessary to be corrected and written is only data of the applied voltage. Accordingly, the focus tables 152c and 152d can be updated as needed while an appropriate interval between focal distances is maintained.

As described above, the code reading apparatus 1 in the embodiment and modifications includes the liquid lens 212 and the focus mechanism 213 which changes the focal distance of the liquid lens 212 by applying the applied voltage thereto, and calculates a distance from the liquid lens 212 to a symbol (target focal distance of the liquid lens 212) based on the coordinates of the bright point formed in a plane, which includes the symbol, by the laser light beam emitted from the aimer 214. The code reading apparatus 1 stores correspondence of the focal distance and the applied voltage applied to the liquid lens 212 by the focus mechanism 213 in the focus table 152. The code reading apparatus 1 refers to the focus table 152 so as to find an appropriate voltage, and applies the found voltage to the liquid lens 212, thereby performing focus adjustment with the laser focus method. In addition, the code reading apparatus 1 calculates contrast values of obtained image data while changing the focal distance of the liquid lens 212 within the preset change range, so as to find an applied voltage with which the contrast peak is obtained, thereby performing focus adjustment with the contrast focus method. The code reading apparatus 1 correlates the target focal distance found by the laser focus method and the applied voltage found by the contrast focus method, so as to correct the contents stored in the focus table 152. Accordingly, even when the properties of the liquid lens 212 gradually change as time passes, the code reading apparatus 1 can be used without decrease of the accuracy of the focus table 152, and hence can perform the focus adjustment with the laser focus method at high speed for a long period of time.

Furthermore, the code reading apparatus 1 uses the contrast focus method when the focus of the liquid lens 212 cannot be accurately on a symbol any longer by the focus adjustment with the laser focus method because the properties of the liquids of the liquid lens 212 change, and the data of the focus table 152 becomes incorrect accordingly. The code reading apparatus 1 corrects the contents stored in the focus table 152 by correlating the target focal distance found by the laser focus method with the applied voltage found by the contrast focus method. Accordingly, the focus table 152 is updated automatically at the minimum frequency by using the contrast focus method, and hence the code reading apparatus 1 can perform the focus adjustment with the laser focus method at high speed for a long period of time.

Furthermore, when a new applied voltage for a focal distance is found by using the contrast focus method, the code reading apparatus 1 adds the focal distance and the applied voltage to the focus table 152. Accordingly, the data of the focus table 152 can be updated gradually.

Furthermore, when a new applied voltage for a focal distance is found by using the contrast focus method, the code reading apparatus 1 replaces the oldest data stored in the focus table 152 at the time with data of the focal distance and the applied voltage. Accordingly, an applied voltage can be found with high accuracy by using only new correspondence data with time. Alternatively, the code reading apparatus 1 replaces, with data of newly found focal distance and applied voltage, data of the focal distance which is proximate to the newly found focal distance among the focal distances stored in the focus table 152 at the time. Accordingly, without increasing the number of pieces of data stored in the focus table 152, and without making uneven distribution of focal distances in the data, an applied voltage can be found.

Furthermore, when a new applied voltage for a focal distance is found by using the contrast focus method, the code reading apparatus 1 can update, based on the focal distance and the applied voltage, data of applied voltages for focal distances next to the focal distance among the focal distances set and stored in the focus table 152 to new values by linear interpolation or the like. Accordingly, without changing the size of the focus table 152 and the arrangement of the focal distances therein, the focus table 152 can be easily updated with balance. Alternatively, based on the amount of change from the original applied voltage to the newly found applied voltage, all the values of the applied voltage set and stored in the focus table 152 can be corrected by using predetermined coefficients. Accordingly, the whole focus table 152 can be easily updated by one correction.

Furthermore, when the focus adjustment with the contrast focus method is performed, the code reading apparatus 1 calculates the contrast by changing the applied voltage only within a predetermined range from the provisional corresponding applied voltage calculated by the laser focus method for the focal distance. Accordingly, it can be expected that the peak as a contrast value is detected promptly, and time required for the contrast focus method can be shortened, the time which is usually long depending on the number of times that the applied voltage changes. Accordingly, even when the focus table 152 is corrected by using the contrast focus method, the decrease of the speed to decode a symbol can be minimized.

Furthermore, the code reading apparatus 1, in the laser focus method, searches for the bright point to find the coordinates of the bright point by using only data of a region in which the bright point can be formed by the aimer 214, and, in the contrast focus method, calculates a contrast value by using only the symbol part (subject area) in which a light part and a dark part are distinct from each other, or by using a part of the symbol part. Accordingly, the amount of mathematic operation can be reduced, and hence time required for each focus adjustment can be shortened.

Furthermore, when the focus adjustment with the contrast focus method is performed, the code reading apparatus 1 turns on the illumination 215 to illuminate the symbol part. Accordingly, the light part and the dark part of the symbol become distinct from each other, and the peak as a contrast value can be certainly detected.

The core reading apparatus of the present invention and the program therefor are not limited to the embodiment and modifications in which the specific configurations and steps are described, and hence can be modified variously.

For example, in the embodiment, the CPU 11 detects the bright point formed by the aimer 214 based on the picked-up image data transferred to the RAM 13 by DMA, identifies the focal distance based on the coordinates of the bright point, calculates the contrast value, and decodes a barcode symbol. However, it is possible that the imager controller 19 has these functions installed on an ASIC substrate so as to execute the functions by mathematical operation with hardware. Alternatively, it is possible that the CPU 11 directly controls all of the functions by not using the imager controller 19.

Furthermore, in the embodiment, when decoding of a symbol by the processing using the contrast focus method (contrast focus processing) is failed, the CPU 11 returns to the processing using the laser focus method (laser focus processing). However, it is possible that the contrast focus processing is performed again by re-setting the change range of the focal distance (applied voltage) for the contrast focus processing.

Furthermore, in the embodiment, the processing to rewrite the focus table 152 (focus table rewriting processing) is additionally performed based on the fact that decoding of a symbol with the laser focus processing succeeds, in the conventional symbol reading. However, the conventional symbol reading processing and the focus table rewriting processing may be performed separately. In this case, a subject for the contrast focus processing is not limited to a barcode or a two-dimensional code.

Furthermore, in the embodiment, as a computer readable medium storing programs of the present invention, namely, a computer program product of the present invention, the storage section 15 (for example, a flash memory, an EEPROM, a hard disk, or a ROM) is used. However this is not a limit. Other than these, a potable recording medium such as a CD-ROM can be used. Furthermore, as a medium to provide data of the programs via a communication line, a carrier wave can be used. Furthermore, the details, such as the numeral values, the order of steps of control or the like, can be appropriately modified without departing from the scope of the present invention.

Several embodiments/modifications of the present invention are described above. However, the scope of the present invention is not limited thereto. The scope of the present invention is the scope of claims attached below including their equivalences.

This application is based upon and claims the benefit of priority under 35 USC 119 of Japanese Patent Application No. 2011-074768 filed on Mar. 30, 2011, the entire disclosure of which, including the description, claims, drawings, and abstract, is incorporated herein by reference in its entirety.

What is claimed is:

1. A code reading apparatus comprising:
   a liquid lens;
   a focus drive section which applies an applied voltage to the liquid lens to adjust a focal distance of the liquid lens;
   a storage section which stores an applied voltage table showing a relationship between the focal distance of the liquid lens and the applied voltage to the liquid lens;
   an image pickup section which obtains image data in an image pickup direction in which the liquid lens faces;
   a light emitting section which emits a laser light beam in the image pickup direction;
   a laser focus section which controls the image pickup section to obtain image data of a subject in a state in which the laser light beam is emitted, and finds a distance from the liquid lens to the subject based on a position of a bright point formed by the laser light beam in the obtained image data, so as to perform laser focus adjustment;
   a contrast focus section which controls the image pickup section to obtain image data of the subject while changing the focal distance of the liquid lens within a preset change range, so as to perform contrast focus adjustment such that the subject is brought into focus based on a magnitude of contrast of the subject included in the obtained image data; and
   a correction section which corrects a content of the applied voltage table based on the distance from the liquid lens to the subject found by the laser focus section and a corresponding applied voltage with which the subject is brought into focus by the contrast focus section;
   wherein the contrast focus section sets, as the preset change range, a range centering on a provisional corresponding applied voltage determined based on the applied voltage table for the found distance.

2. The code reading apparatus according to claim 1, wherein when decoding of the subject included in image data obtained based on the laser focus adjustment fails, and the contrast focus adjustment is performed, the correction section corrects the content of the applied voltage table based on the found distance and the corresponding applied voltage.

3. The code reading apparatus according to claim 1, wherein the correction section correlates the found distance with the corresponding applied voltage, and adds the distance and the corresponding applied voltage to the applied voltage table.

4. The code reading apparatus according to claim 1, wherein the correction section replaces data determined based on a given condition among data recorded on the applied voltage table with the found distance and the corresponding applied voltage.

5. The code reading apparatus according to claim 1, wherein the correction section corrects values of the applied voltage recorded on the applied voltage table based on the found distance and the corresponding applied voltage.

6. The code reading apparatus according to claim 1, wherein each of the laser focus section and the contrast focus section performs the focus adjustment based on image data of a predetermined portion of an image pickup available extent for the image pickup section.

7. The code reading apparatus according to claim 1, further comprising an illuminating section which illuminates a subject area in the image pickup direction, wherein the contrast focus section turns on the illuminating section when performing the contrast focus adjustment.

8. A non-transitory computer readable medium having stored thereon a program for controlling a computer of a code reading apparatus including: a liquid lens; a focus drive section which applies an applied voltage to the liquid lens to adjust a focal distance of the liquid lens; an image pickup section which obtains image data in an image pickup direction in which the liquid lens faces; and a light emitting section which emits a laser light beam in the image pickup direction, said program controlling the computer of the code reading apparatus to perform functions comprising:
   (i) storing an applied voltage table showing a relationship between the focal distance of the liquid lens and the applied voltage to the liquid lens;
   (ii) obtaining image data of a subject by the image pickup section in a state in which the laser light beam is emitted, and finding a distance from the liquid lens to the subject based on a position of a bright point formed by the laser light beam in the obtained image data, so as to perform laser focus adjustment;
   (iii) obtaining image data of the subject by the image pickup section while changing the focal distance of the liquid lens within a preset change range, so as to perform contrast focus adjustment such that the subject is brought into focus based on a magnitude of contrast of the subject included in the obtained image data; and
   (iv) correcting a content of the applied voltage table based on the found distance from the liquid lens to the subject and a corresponding applied voltage with which the subject is brought into focus;
wherein the preset change range is a range centering on a provisional corresponding applied voltage determined based on the applied voltage table for the found distance.

* * * * *